US010037721B2

(12) United States Patent
Lawson

(10) Patent No.: US 10,037,721 B2
(45) Date of Patent: Jul. 31, 2018

(54) DISPLAY APPARATUS

(71) Applicant: Richard John Lawson, Ellastone Nr. Ashbourne (GB)

(72) Inventor: Richard John Lawson, Ellastone Nr. Ashbourne (GB)

( * ) Notice: Subject to any disclaimer, the term of this patent is extended or adjusted under 35 U.S.C. 154(b) by 0 days.

(21) Appl. No.: 15/555,790

(22) PCT Filed: Feb. 25, 2016

(86) PCT No.: PCT/GB2016/050486
§ 371 (c)(1),
(2) Date: Sep. 5, 2017

(87) PCT Pub. No.: WO2016/139453
PCT Pub. Date: Sep. 9, 2016

(65) Prior Publication Data

US 2018/0040265 A1 Feb. 8, 2018

(30) Foreign Application Priority Data

Mar. 2, 2015 (GB) .................................. 1503468.9

(51) Int. Cl.
*F16M 11/00* (2006.01)
*G09F 15/00* (2006.01)

(52) U.S. Cl.
CPC ...... *G09F 15/0025* (2013.01); *G09F 15/0018* (2013.01); *G09F 15/0068* (2013.01); *G09G 2380/02* (2013.01)

(58) Field of Classification Search
CPC ........................... G09F 155/0068; G09F 17/00
See application file for complete search history.

(56) References Cited

U.S. PATENT DOCUMENTS 4,041,861 A * 8/1977 Alter ........................ B41F 15/36 101/127.1
5,046,545 A * 9/1991 Loomis .................. B44D 3/185 160/328
6,988,695 B2 * 1/2006 Burris ................. G09F 15/0025 248/164
7,117,620 B2 * 10/2006 Tolna ........................ G09F 7/00 40/601
7,874,090 B2 * 1/2011 Flagg .................. G09F 15/0068 116/63 P (Continued)

FOREIGN PATENT DOCUMENTS

WO 2006086847 A1 8/2006
WO 2012115566 A1 8/2012

OTHER PUBLICATIONS

International Search Report and Written Opinion dated May 2, 2016 for PCT Application No. PCT/GB2016/05486, 8 pages.

*Primary Examiner* — Amy J. Sterling
(74) *Attorney, Agent, or Firm* — Han Santos PLLC

(57) ABSTRACT

A display apparatus 10 and a support arrangement 16 and flexible display member 14. A support arrangement 16 includes an elongate support member 44 with an upper transverse member 54 at its upper end, and urge resiliently upwardly therefrom. A lower transverse member 48 is provided the lower end of the elongate support member 44. The upward resilient urging of the upper transverse members 54 applies tension to a display member extending between the lower and upper transverse members 48, 54.

20 Claims, 17 Drawing Sheets

(56) References Cited

U.S. PATENT DOCUMENTS

| | | | | |
|---|---|---|---|---|
| 8,549,778 | B2 * | 10/2013 | Ahlberg | G09F 15/0068 248/165 |
| 2009/0056184 | A1 | 3/2009 | Fritsche et al. | |

* cited by examiner

DISPLAY APPARATUS

This invention concerns display apparatus.

Display apparatus is widely used at exhibitions and elsewhere to for instance display details of a company, their products and/or services. It is desirable if such apparatus can readily be erected and also taken down. A number of display apparatus use sheets of flexible material, and it is a requirement that these sheets are supported so as to remain as taut as possible so as to provide a pleasing appearance and a clear display.

According to a first aspect of the invention there is provided a display apparatus, the apparatus comprising a flexible display member in the form of a sheet of material, and a support arrangement, the support arrangement including an elongate support member locatable behind the display member to support same, the support member having a main section with a lower part which is engageable with a lower end of the display member and an upper section which is engageable with an upper end of the display member, the main and upper sections being resiliently urged apart so as to apply tension to the display member when engaged therewith, an upper transverse member is provided connected to the upper section of the support member, opposite ends of the upper transverse member are engageable respectively by connection arrangements with top corners of the display member, the connection arrangements being configured such that as the upper transverse member is moved upwardly this causes the respective top corners of the display member to be urged outwardly, thereby applying tension across the top of the display member.

The apparatus may include a lower transverse member at a lower end of the main section of the elongate support member, which lower transverse member is engageable with lower corners of the display member.

Respective connection arrangements may be provided for engaging together the lower transverse member and lower corners of the display member.

Each connection arrangement may comprise a projection on a one of the display member or transverse member, which projection is selectively locatable in a corresponding recess in the other of the display member or transverse member, with the recess and/or projection being profiled such that as the transverse member is moved upwardly this causes the display member to be urged outwardly.

The projection on each connection arrangement may include a profiled edge engageable with an edge of the respective recess such that as for instance when the upper transverse member is moved upwardly, this urges the upper corners of the flexible display member outwardly.

The profiled edge of the projection may be inclined relative to a vertical alignment, and at upper ends of the display member may be inclined upwardly inwards. At lower ends of the display member the projection profiled edge may be inclined downwardly inwards.

A profiled edge may be provided on the recesses with which profiled edge the respective projection profiled edge is engageable.

Cooperable magnets may be provided respectively on the projections and recesses to facilitate correct location of a projection in a corresponding recess.

The projections may be provided on the transverse member or members, with the recesses provided on corners of the display member. Stiffening strips may be provided at one or both ends of the display member, and the recesses may be mounted at respective ends of the strips.

A lip may be provided in the recesses such that a part of the respective projections locates behind the lip when engaged with the respective recess, to retain the projection in the recess.

The profiled edge of the projection and/or recess may be inclined at an angle of between 30 and 60° to the vertical, and may be inclined at an angle of between 40 and 50° to the vertical.

The apparatus may include a ground engageable base. The base may include a foot, which foot may extend forwards and rearwards relative to the elongate support member.

The base may include ground engageable projections extending from the underside of the lower transverse member.

The elongate support member may comprise an elongate part providing the main section, and a mounting part providing the upper section, which mounting part is vertically slidably movable along an upper section of the elongate part, and is resiliently upwardly urged.

A channel may be provided in the elongate support member which slidably locates the mounting part. A fixed member may be provided in the channel with the mounting part located in the channel above the fixed member with a resilient member located therebetween. The resilient member may be in the form of a compression spring.

An upper mounting bracket which mounts the upper transverse member may connect to the mounting part, and a part of the mounting part may locate in a channel.

A lower mounting bracket may be fixedly connected to a lower part of the elongate support member to mount the lower transverse member.

According to a second aspect of the invention there is provided a display assembly incorporating a plurality of display apparatus according to any of the preceding sixteen paragraphs.

The assembly may also include one or more additional flexible display members which are extendible between a pair of flexible display members supported by respective support arrangements, but which additional flexible display member is not supported by a respective support arrangement.

Adjacent flexible display members may be mountable together, and may have cooperable strips extending along their side edges. The cooperable strips may include respective magnets. A magnetic strip may be provided along each side edge of the flexible display members on the rear side thereof, and a flexible connecting member including an elongate flexible magnet may be locatable behind and overlapping the flexible display members, and magnetically engageable with the respective flexible magnets on the adjacent display members.

The flexible connecting member may include an upper mounting bracket which is engageable with respective connection arrangements on the upper corners of the flexible display members. A mounting bracket may be provided at the lower end of the flexible connecting magnet engageable with respective lower connecting arrangements.

Embodiments of the present invention will now be described by way of example only and with reference to the accompanying drawings, in which:—

Figure 1:
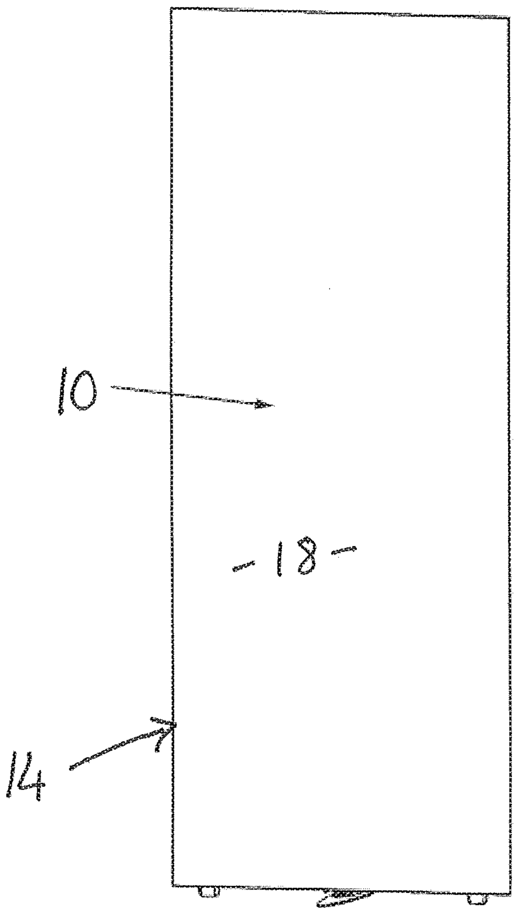
FIG. 1 is a diagrammatic front view of a display apparatus according to the invention.

The drawings show a display apparatus 10 and also a display assembly 12 made of such apparatus 10. Each apparatus 10 includes a flexible display member 14 which may be made for instance of a sheet of plastics material and may be decorated or marked with appropriate material on its front face. Each apparatus 10 also includes a support arrangement 16.

Each display member 14 comprises a rectangular sheet 18 which is around two and a half times taller than it is wide. A length of magnetic tape 20 is provided on the rear side of the sheet 18 along each side edge. A flexible plastics material stiffener strip 22 is provided extending across the top and bottom edges of the sheet 18, again on the rear side thereof.

A first connection arrangement 24 is provided at each corner of the sheet 18 again on the rear side thereof. Each first connection arrangement 24 comprises a rear plate 26 mountable to the respective stiffener strip 22. A profiled front plate 28 is provided spaced from the rear plate 16 to define a profiled recess therebetween. The front plate 28 extends for almost the full height of the rear plate 26 adjacent the corner of the sheet 18, but spaced inwardly from each respective corner the front plate has a profiled lip 30. The profiled lip 30 provides a recess 32 with an inclined face 34 extending towards the outer edge of the respective sheet 28 for the majority of the height of the rear plate 16, with the inclined face 34 terminating in a generally semi-circular face 36 leading to a downwardly extending lip 38 extending for part of a height of the rear plate 26.

A further recess 40 is provided between the rear and front plates 26, 28 on the outer edge of the sheet 18, for a purpose hereinafter to be described.

Figure 9:
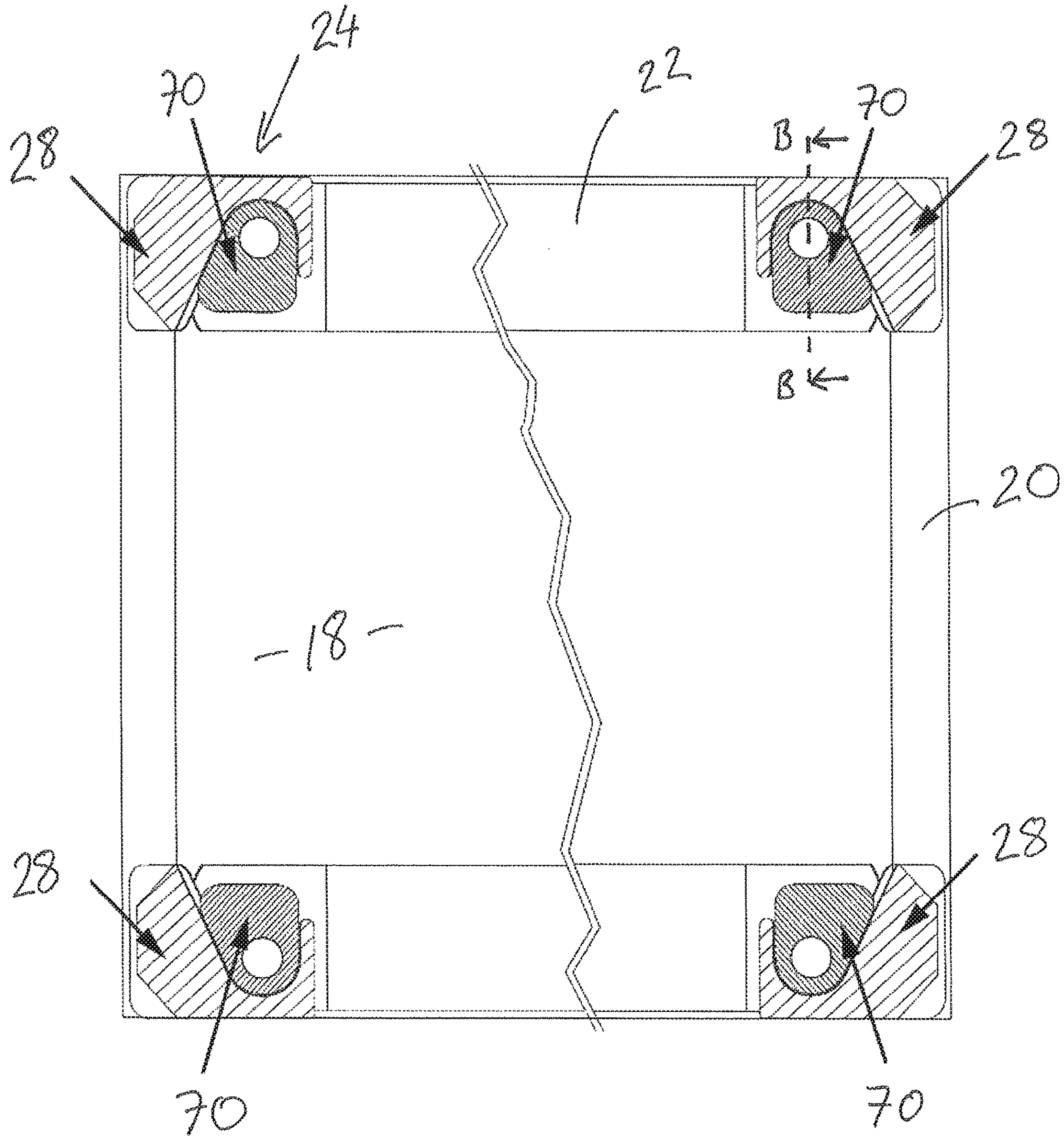
FIG. 9 is a diagrammatic illustrative rear view showing parts of the apparatus of FIG. 1.
Figure 10:
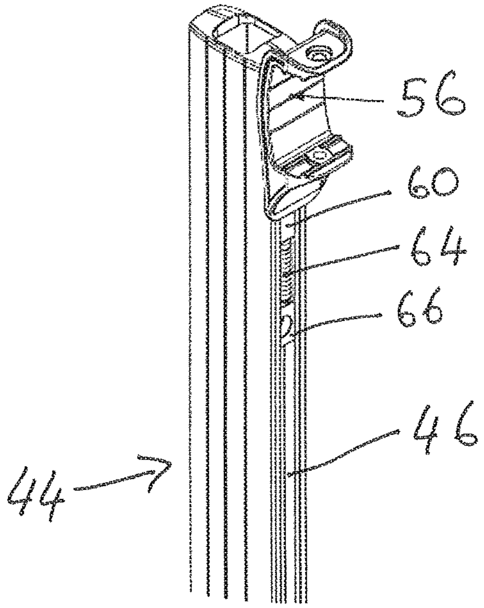
FIG. 10 is a diagrammatic perspective front view of part of the apparatus of FIG. 1.
Figure 11:
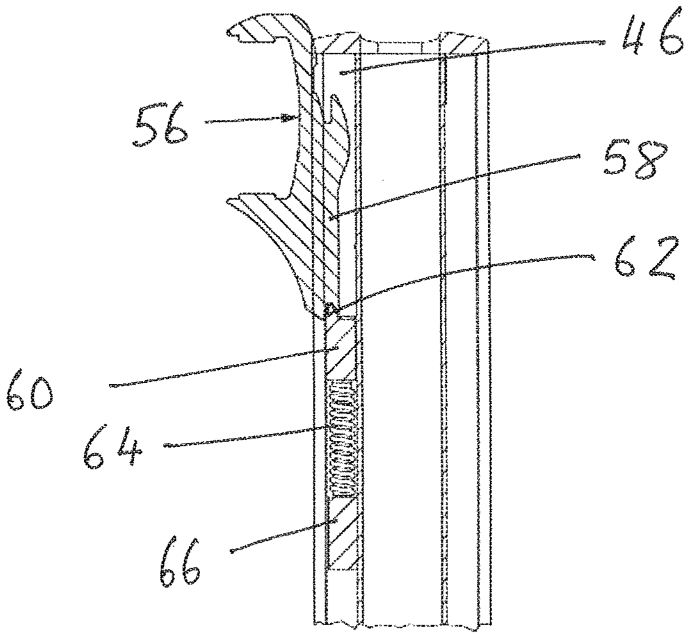
FIG. 11 is a diagrammatic cross sectional view of the part of the apparatus shown in FIG. 10.

A first connection arrangement 24 is provided on each corner of the sheet 18, with the inclined face 34 inclined towards the respective side edge of the sheet 18 and also away from the respective top or bottom edge of the sheet 18. The configuration of the first connection arrangement 24 on each corner is best shown diagrammatically in FIG. 9.

Each support arrangement 16 comprises a foot 42 which extends forwards and rearwards. An elongate support member 44 is upstanding from the foot 42. The support member 44 has a front facing channel 46. At the lower end of the support member 44, spaced just above the foot 42 a lower transverse member 48 is provided mounted to the support member 44 by a bracket (not shown) engaging in the channel 46.

Downwardly extending feet 50 are provided on the underside of the lower transverse member 48 towards each end so as to be ground engaging. A second connection arrangement 52 is provided on the front side at each end of the lower transverse member 48 and will be hereinafter described.

An upper transverse member 54 is also provided. The upper transverse member 54 is mounted to a profiled bracket 56 of a similar type which mounts the lower transverse member 46 but is not visible in the drawings.

The mounting bracket 56 has a finger 58 which is slidably located in the channel 46. Located in the channel 46 immediately below the finger 58 is a sliding block 60 with a projection 62 which engages in a recess in the lower end of the finger 58. Below the sliding block 60 a compression spring 64 is located in the channel 46, which spring 64 rests on a fixed block 66 located in the channel 46 a short distance below the top of the elongate support member 44. The compression spring 64 urges the finger 58 and hence bracket 56 upwardly.

Figure 2:
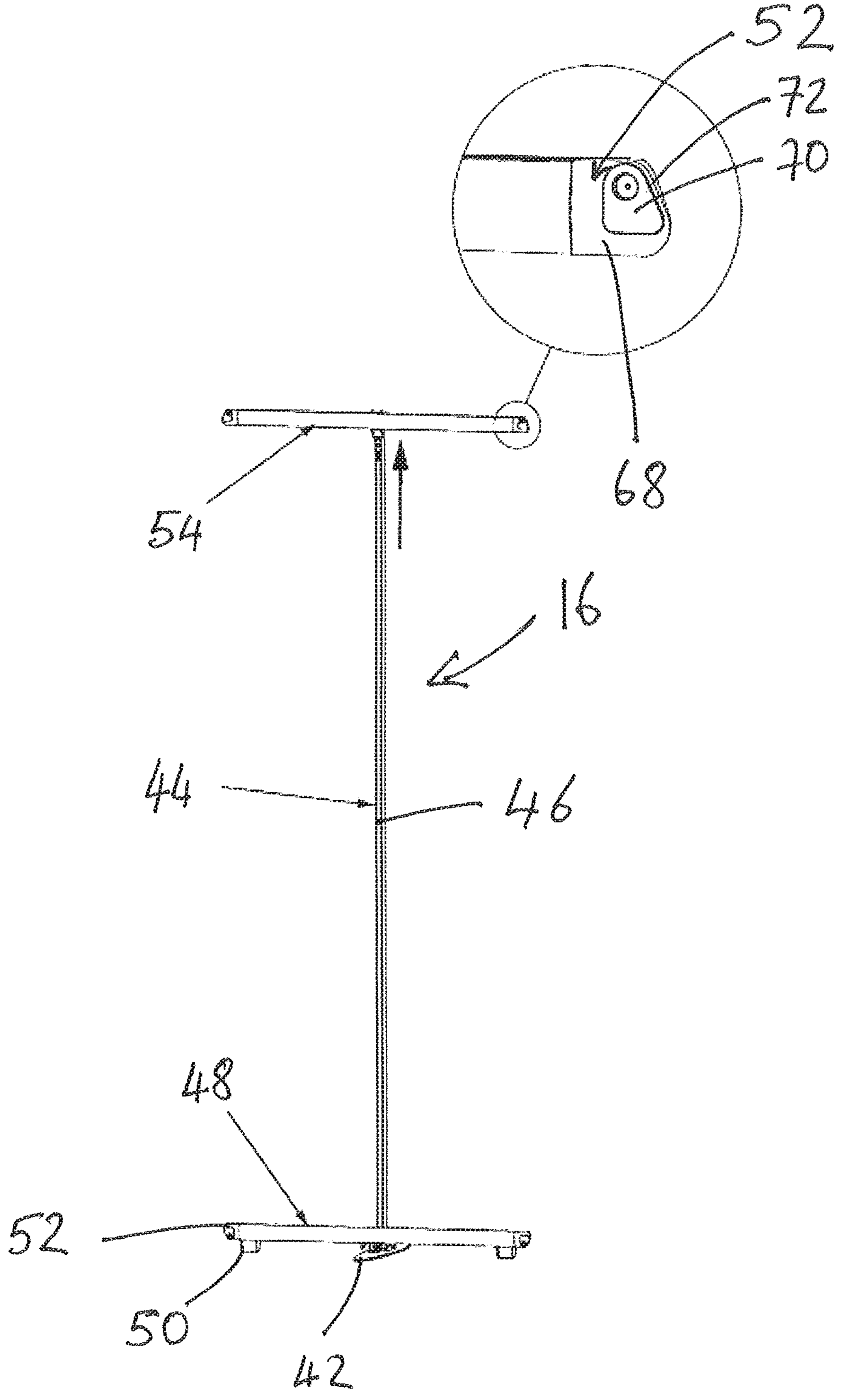
FIG. 2 is a diagrammatic front view of part of the display apparatus of FIG. 1, with an enlarged detailed section.
Figure 3:
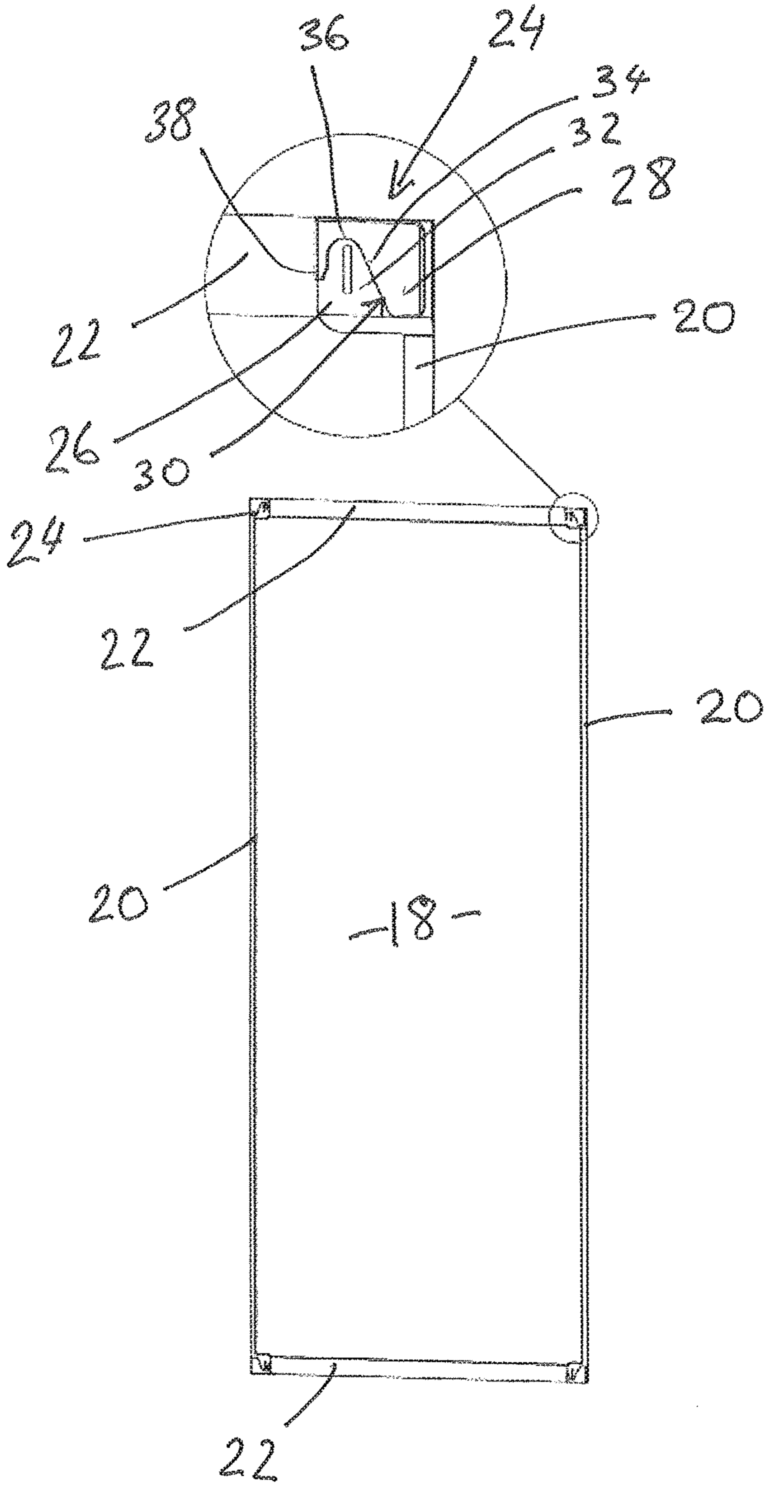
FIG. 3 is a diagrammatic rear view with a detailed section of another part of the apparatus of FIG. 1.

As indicated a second connection arrangement 52 is provided on each end of the lower and upper transverse members 48, 54. Each second connection arrangement 52 comprises a rear plate 68 from which a profiled projection 70 extends. The projection 70 has a generally rounded triangular profile as can be shown in FIGS. 2 and 9, and the projection locates in the recess 30 provided by the first connection arrangement 24. The triangle of the projection has two perpendicular sides interconnected by an inclined side 72, which inclined side faces outwardly and upwards on the upper transverse members 54, and downwardly on the lower transverse member 48.

A lip 71 is provided on the inclined side 72 of the projection 70, and the lip 71 locates in the recess 32 to retain together the first and second connection arrangements 24, 52.

Figure 21:
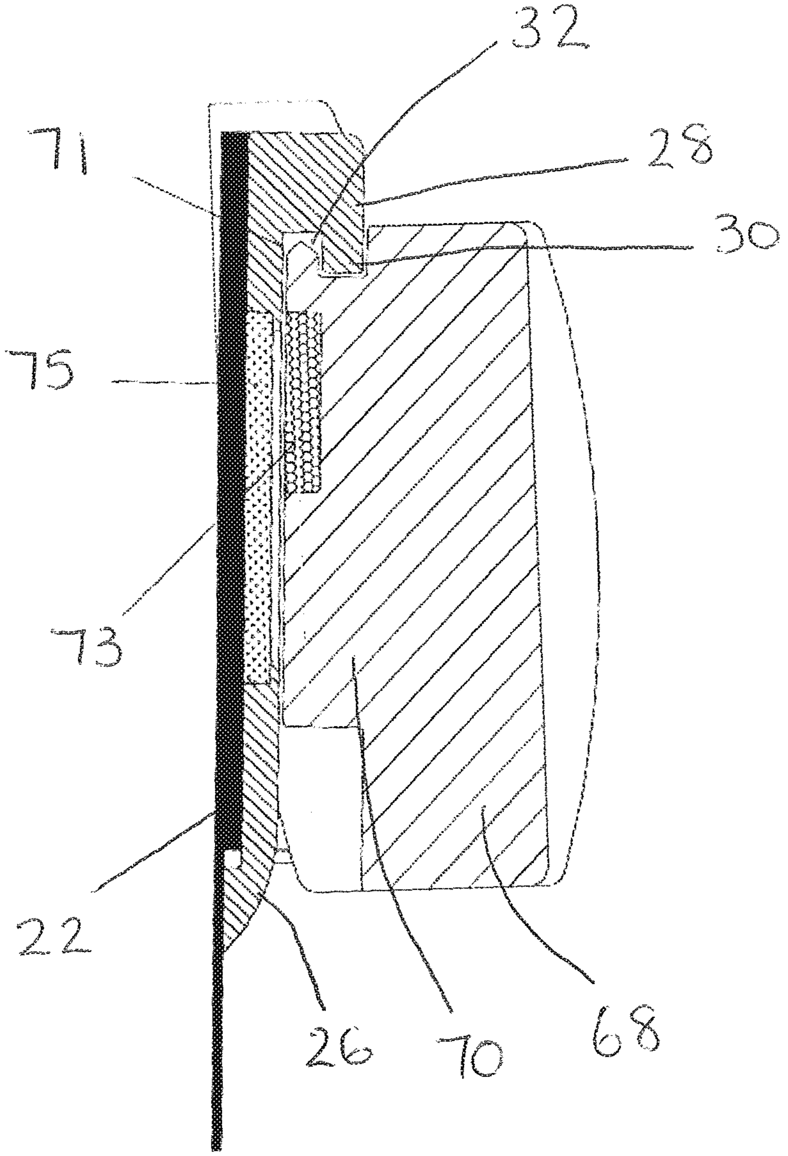
FIG. 21 is a diagrammatic sectional view along the line B-B on FIG. 9.

As can be seen in FIG. 21 a first magnet 73 is provided within the projection 70. A second cooperable magnet 75 is provided in the plate 26 at a location to correspond to the magnet 73 when the lip 71 is engaged with the recess 30, to further retain together the first and second connection arrangements 24, 52.

Each second connection arrangement 52 is configured such that the inclined side 72 engages against the inclined face 34 of the first connection arrangement 26.

In use the flexible display member 14 is mounted on the support arrangement 16 by location of the projections 70 on the support arrangement 16, in the respective recesses 32 on the first connection arrangements 24 in each corner of the sheet 18. To mount the display member 14 on the support arrangement 16, it would generally be necessary to hold down the upper transverse bar 54 against the force of the compression spring 64.

Figure 4:
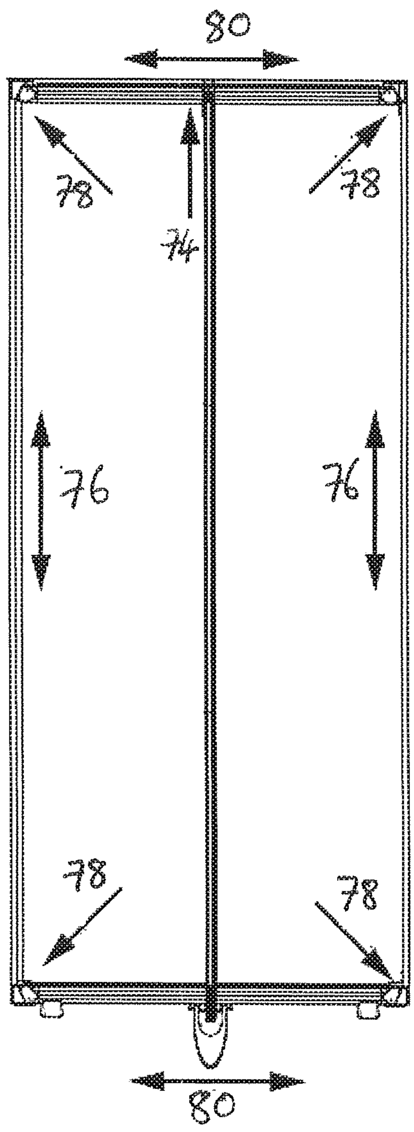
FIG. 4 is a diagrammatic rear view of the apparatus of FIG. 1.

FIG. 4 illustrates the forces and tension applied to the flexible display member 14 by the support arrangement 16, once mounted thereto. The main force applied is shown by the arrow 74 by virtue of the spring 64 urging the upper transverse member 54 upwardly. This provides vertical tension shown by the arrows 76 in the sheet 18. By virtue of the profiles of the projections 70 in the recesses 32 a resultant force shown by the arrows 78 is provided in each corner of the sheet 18 in an outwards direction. This then also produces a horizontal tension in the sheet 18 shown by the arrows 80.

Therefore by virtue of the resilient urging of the upper transverse member 54, and the profiles of the first and second connection arrangements 24, 52, tension is applied both vertically and horizontally to the sheet 18, thereby providing a taut and thus smooth and aesthetically pleasing configuration of the flexible display member 14.

Figure 5:
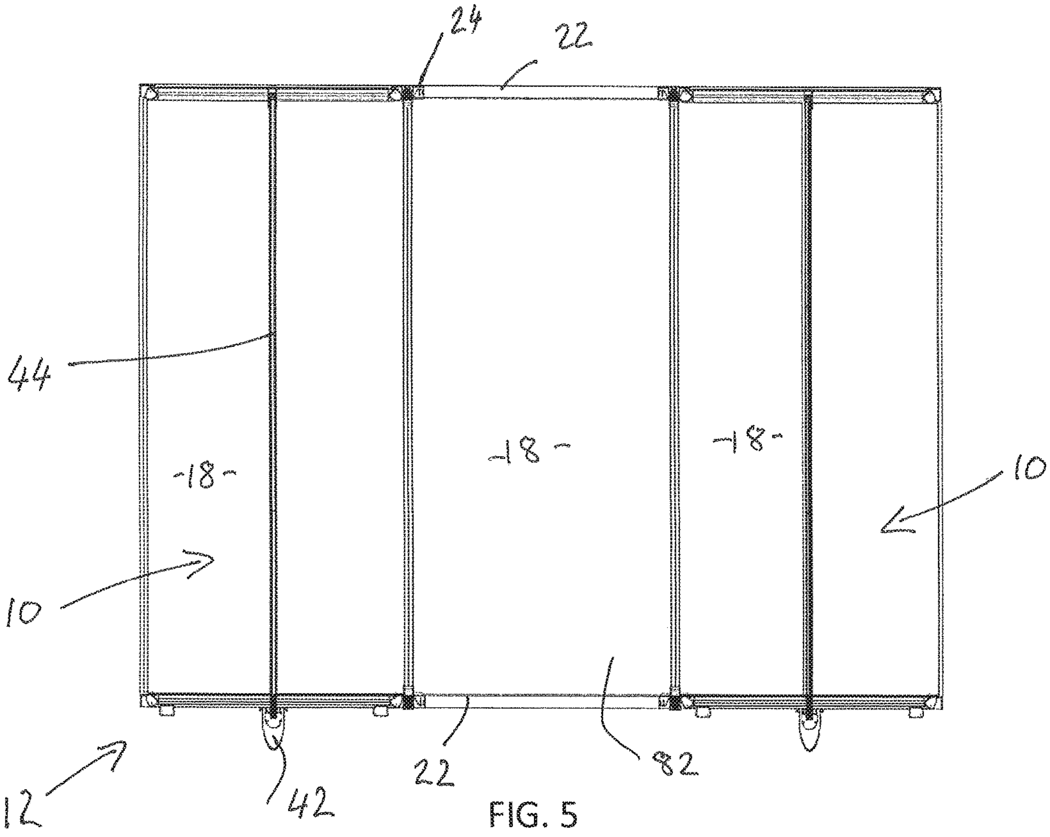
FIG. 5 is a diagrammatic rear view of a display assembly according to the invention.
Figure 6:
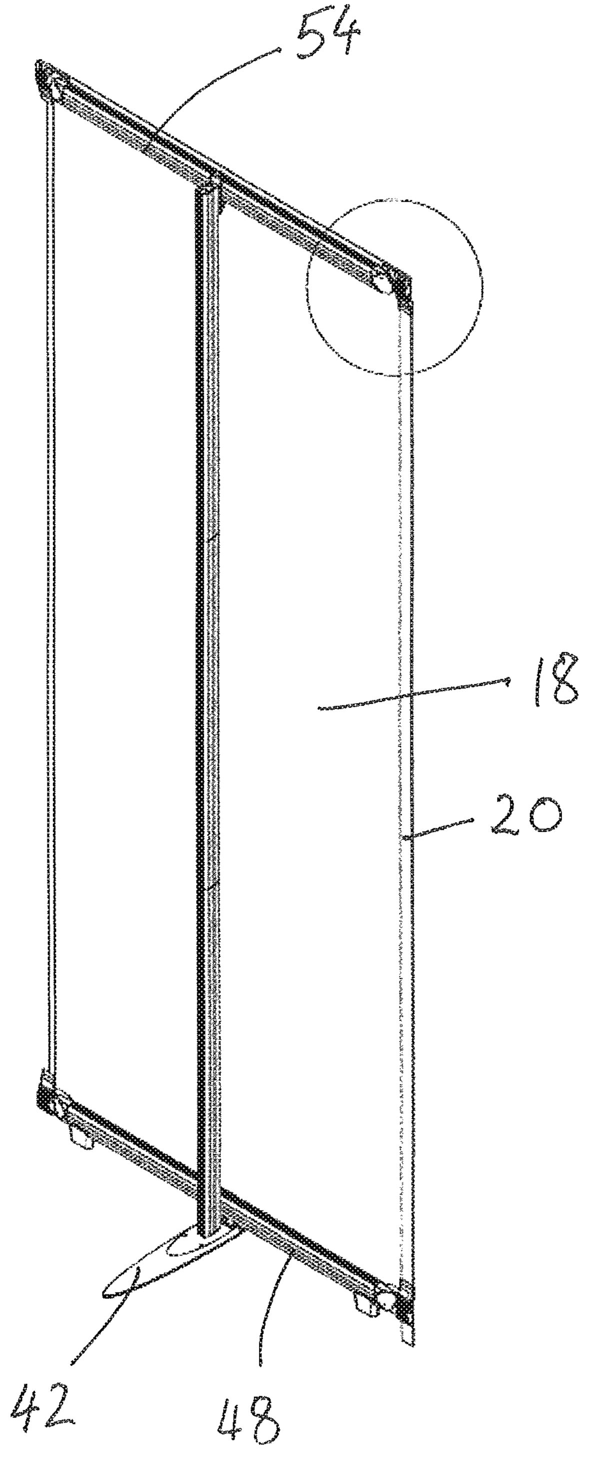
FIG. 6 is a diagrammatic perspective rear view of the apparatus of FIG. 1.
Figure 7:
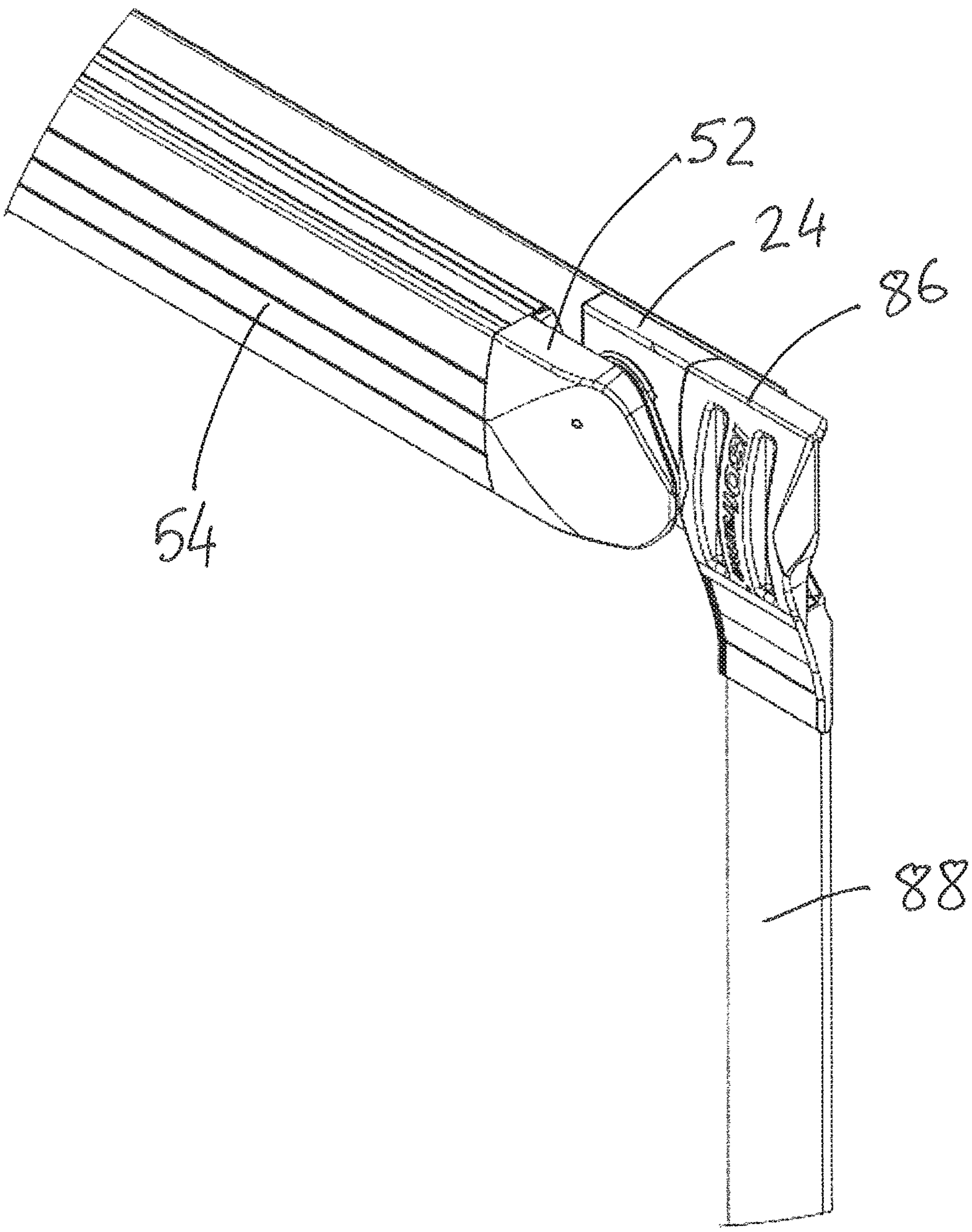
FIG. 7 is a detailed view of the circled part of the apparatus of FIG. 6.

FIG. 5 and also FIGS. 15-20 show a display arrangement 12 with two display apparatus 10 with an intermediate flexible display member 82 between the two display apparatus 10, which intermediate display member 82 does not require a respective support arrangement 16. Otherwise the intermediate display member 82 is the same as the display members 14 on either side.

Figure 12:
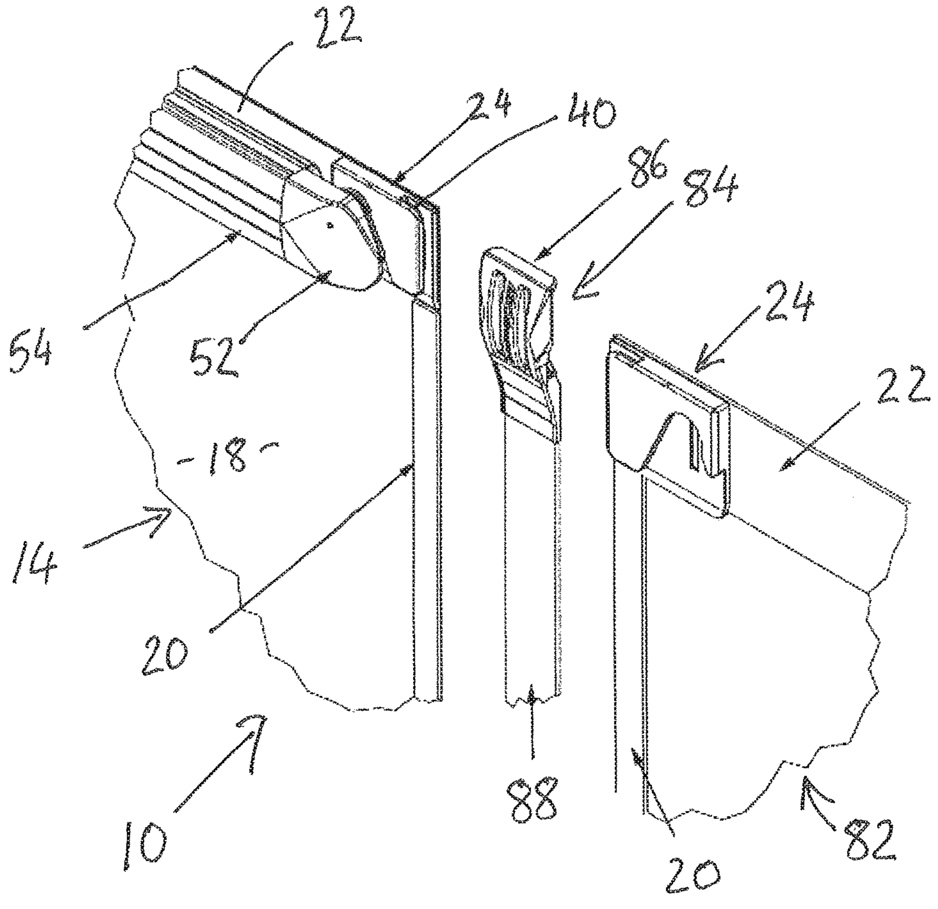
FIGS. 12-14 are diagrammatic sequential perspective rear views showing upper parts of two parts of the assembly of FIG. 5 being connected together.
Figure 13:
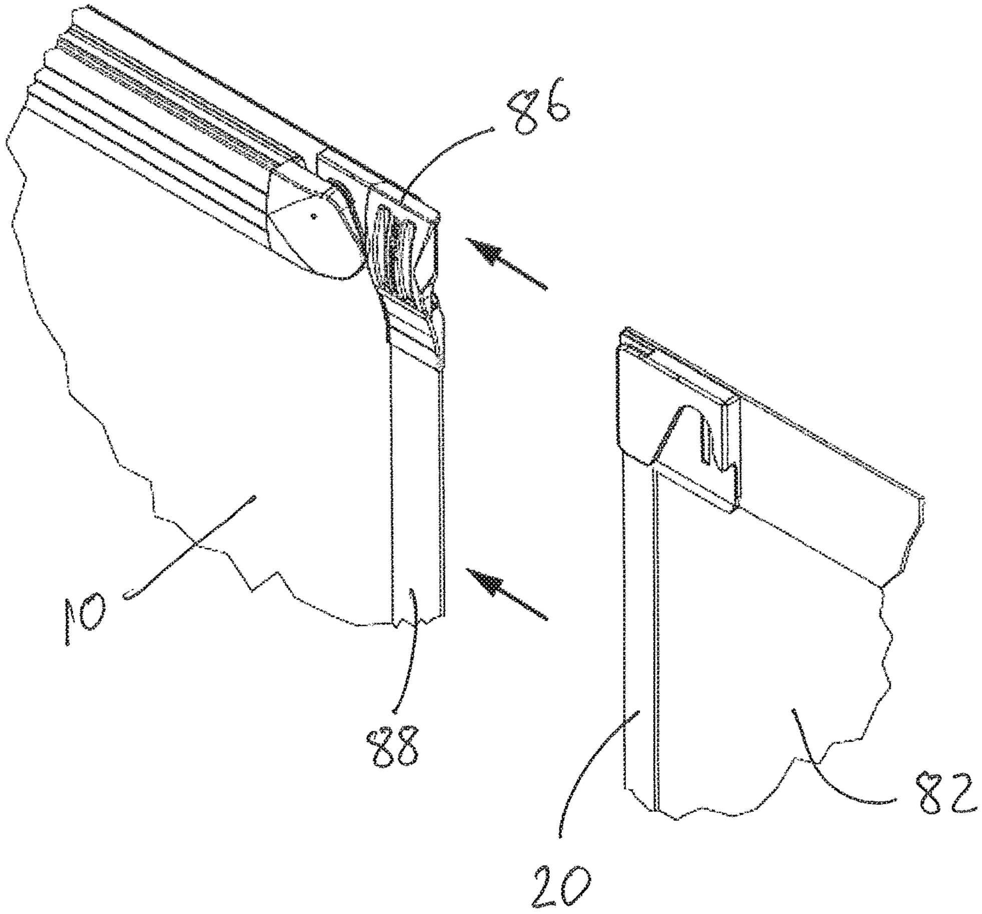
Figure 14:
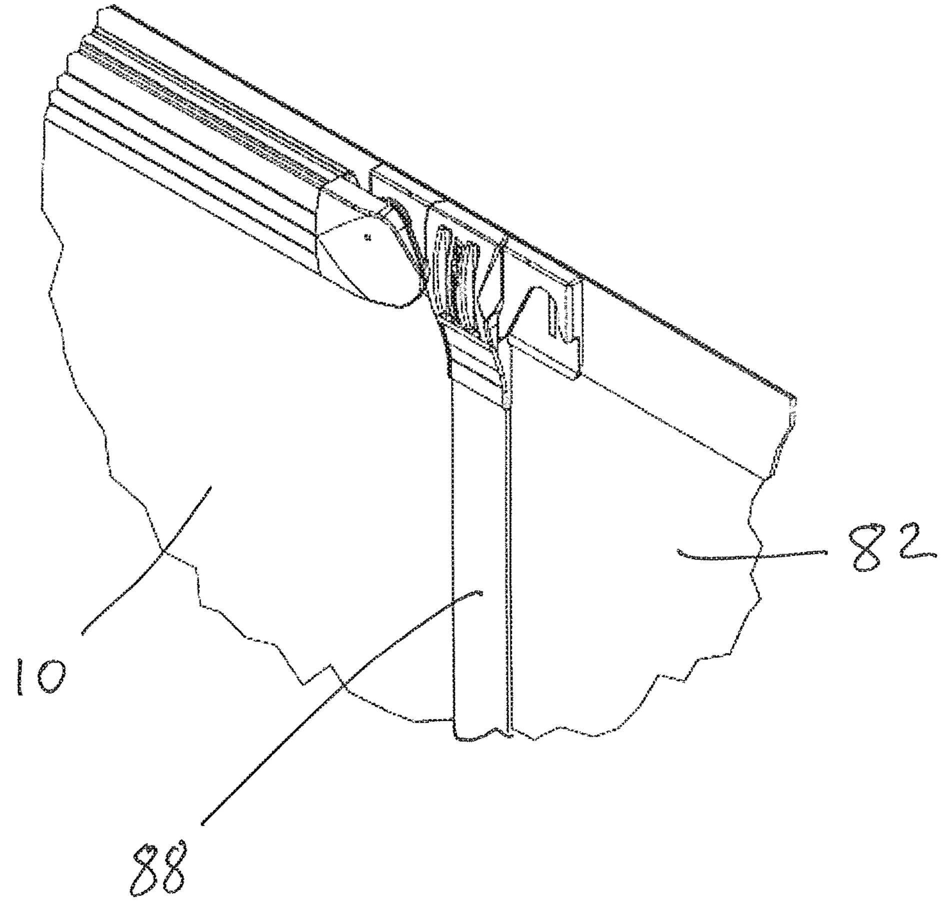

FIGS. 12-14 show interconnection of two flexible display members 14, one supported by a support arrangement 16 with the upper transverse member 52, and the other being an intermediate display member 82. The magnetic tapes 20 on each sheet 18 are aligned next to each other. A connector member 84 is then introduced. The connector member 84 has an upper profiled member 86, part of which can slidingly locate respectively in the recesses 40 on each side of the first connection arrangements 24.

Figure 15:
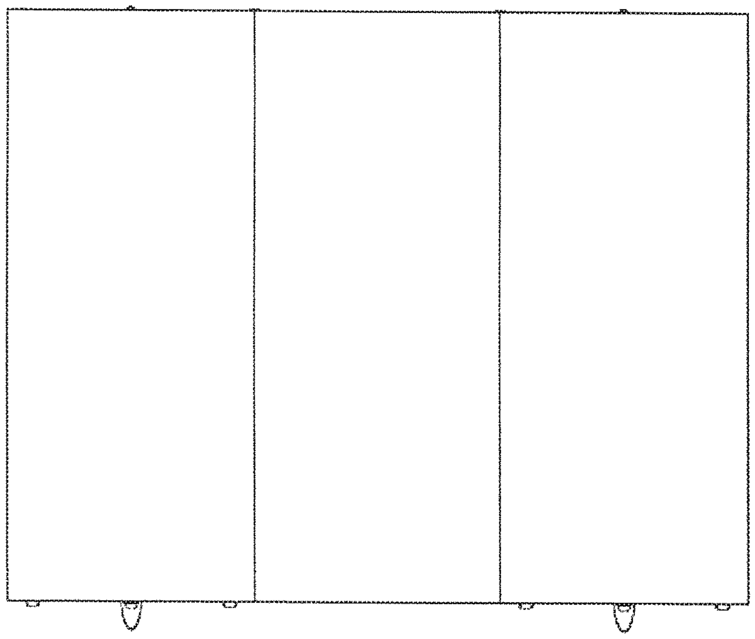
FIGS. 15 and 16 are respectively front and rear views of the assembly of FIG. 5 in a first configuration.
Figure 16:
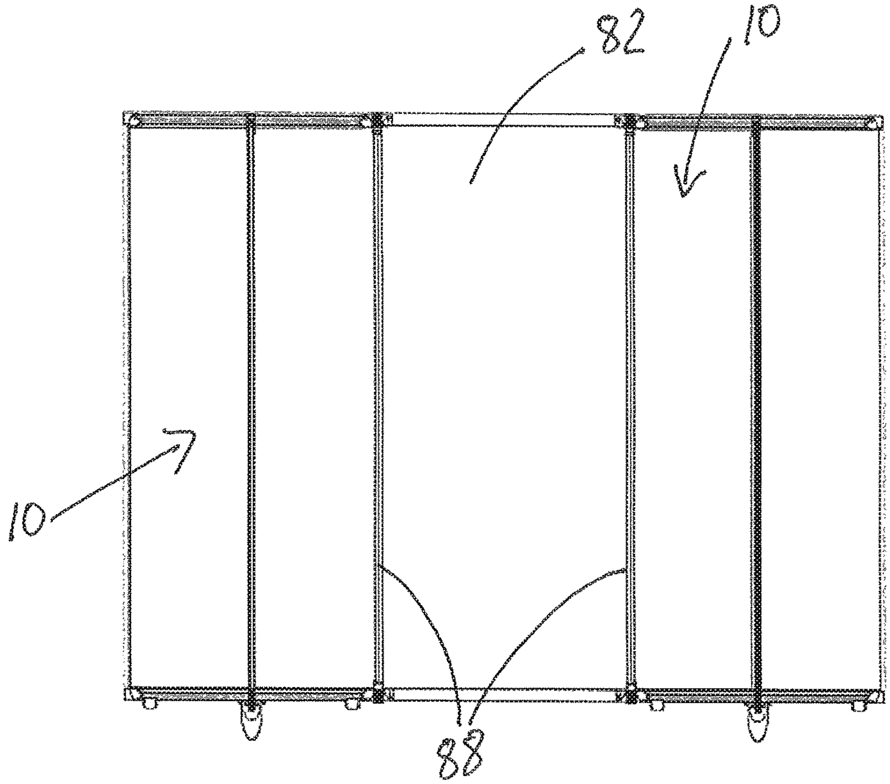
Figure 17:
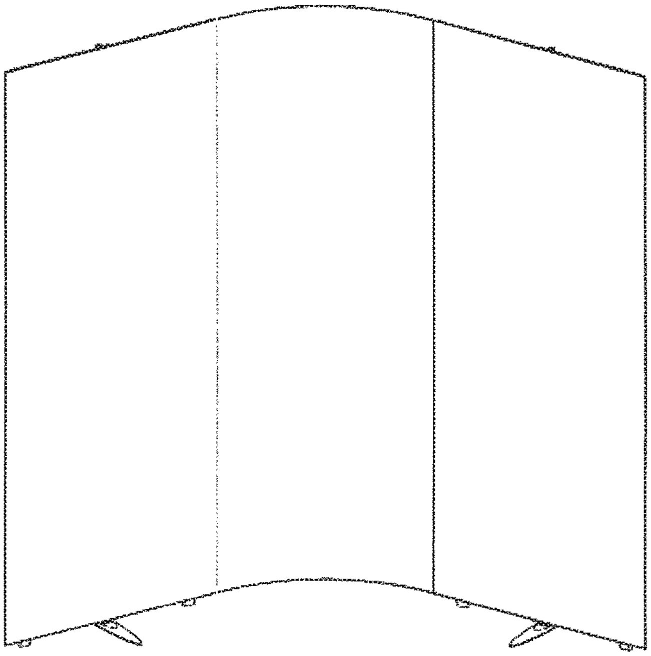
FIGS. 17 and 18 are respectively front and rear views of the assembly of FIG. 5 in a second configuration.
Figure 18:
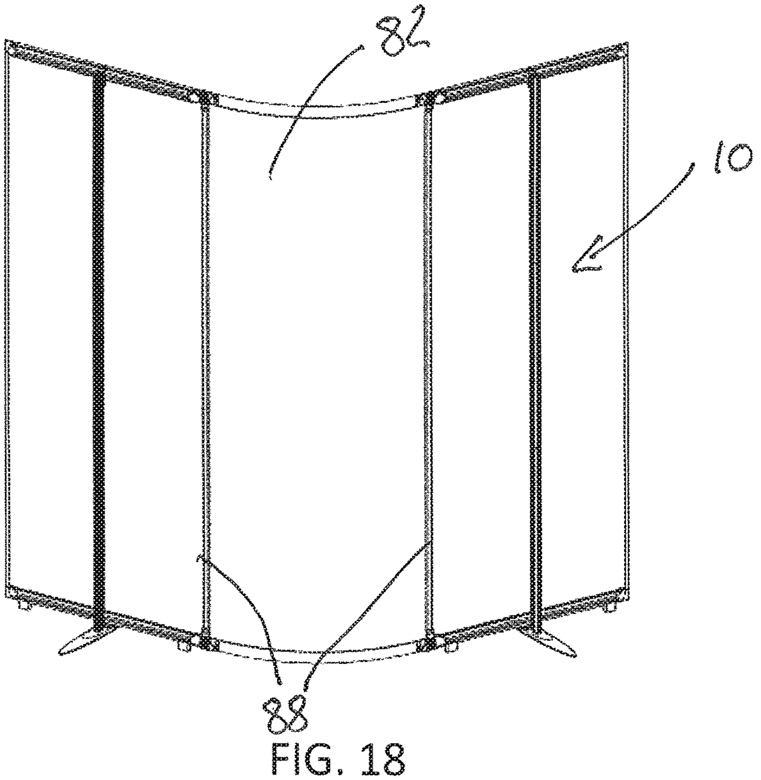
Figure 19:
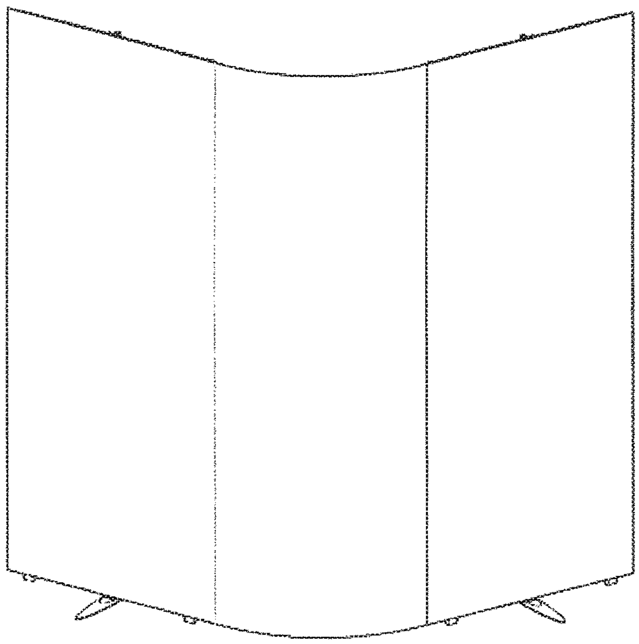
FIGS. 19 and 20 are respectively front and rear views of the assembly of FIG. 5 in a third configuration.
Figure 20:
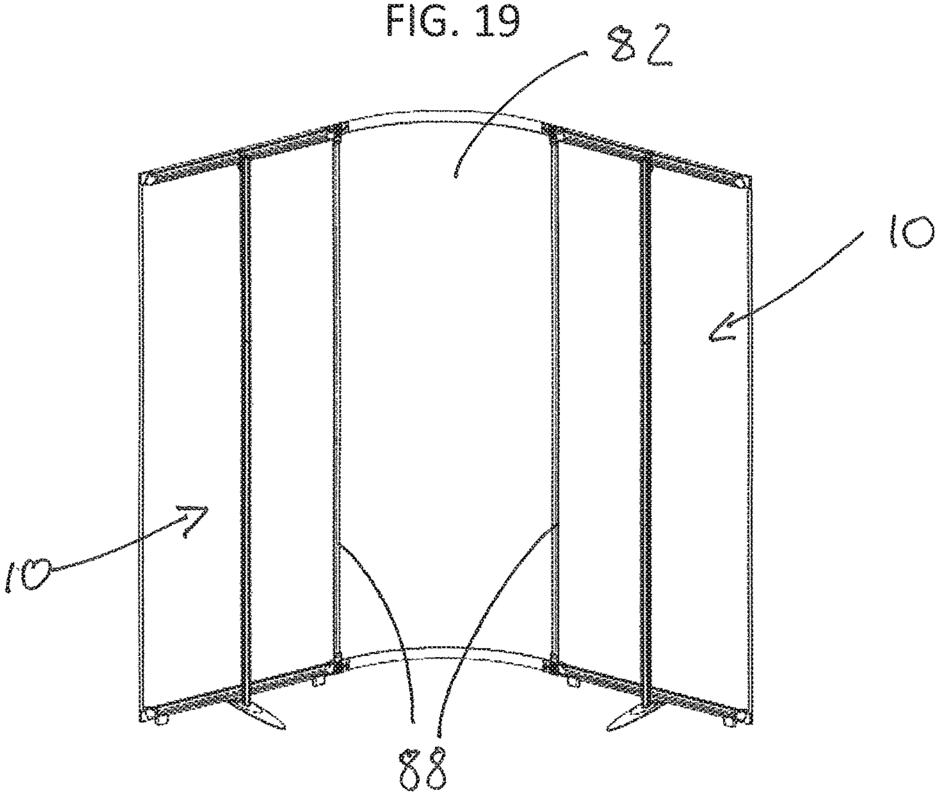

Extending from the profiled member 86 is a flexible magnetic tape 88 which can extend on the rear side of the magnetic tapes 20 to interconnect these. As the magnetic tape 88 is flexible this permits the display assemblies 12 to adopt for instance any of the configurations shown in FIGS. 15-20. FIGS. 15 and 16 show a straight configuration. FIGS. 17 and 18 show a concave configuration, and as can be seen the intermediate flexible display member 82 can curve appropriately. FIGS. 19 and 20 show a convex configuration of the display assembly 12.

There is thus described a display apparatus, and one which permits a wide range of display assemblies to be formed, which provides a number of advantageous features. Whilst the apparatus is of relatively straightforward construction, it can provide an aesthetically pleasing arrangement with a well supported and tensioned flexible display member. This apparatus permits semi-rigid display members to be used which can provide aesthetically pleasing curves, in contrast to many prior arrangements.

It is to be realised that display apparatus and assemblies according to the invention can be used in a wide range of configurations, and with different flexible display members as may be desired. Similar display members can be used whether supported or extending between supported display members. This provides significant flexibility in allowing any required number of display members to be used, and the expense of different types of supported and unsupported display members is avoided. Accordingly different arrangements of display members could be used for different situations so that more display members could be used where a large area is available, but only a reduced number of display members could be used in smaller locations.

Figure 8:
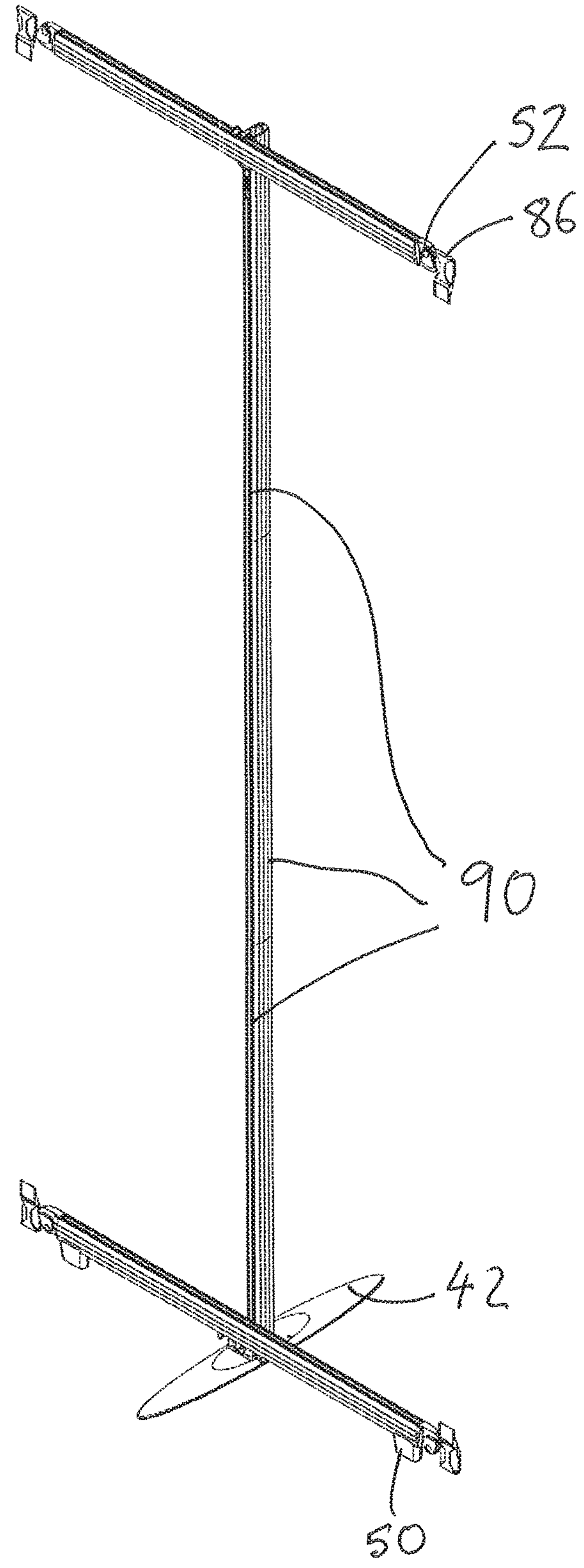
FIG. 8 is a diagrammatic front perspective view of part of the apparatus of FIG. 1.

The apparatus can however readily be assembled, and also collapsed. The foot 42 and elongate support member 44 can be disengaged. The lower and upper transverse members 48, 54 can be disengaged from the respective brackets 56. As can be seen from FIG. 8, the elongate support member 42 may be formed in three parts 90. The flexible display member 14 can be removed from the support arrangement 16 and rolled up or otherwise stored. The connector member 84 can also be rolled for storage.

It is to be realised that a wide range of modifications may be made without departing from the scope of the invention. For instance the resilient urging of the upper transverse member 52 may be provided by a different arrangement. Different means may be provided for mounting the flexible display members on the support arrangement.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A display apparatus, comprising:

a flexible display member in a form of a sheet of material;

a support arrangement, the support arrangement including an elongate support member locatable behind the flexible display member to support same, the support member having a main section with a lower part which is engageable with a lower end of the flexible display member and an upper section which is engageable with an upper end of the flexible display member, the main and upper sections being resiliently urged apart so as to apply tension to the flexible display member when engaged therewith; and an upper transverse member connected to the upper section of the support member, opposite ends of the upper transverse member are engageable respectively by connection arrangements with top corners of the flexible display member, the connection arrangements being configured such that as the upper transverse member is moved upwardly, respective top corners of the flexible display member are urged outwardly to apply tension across a top of the flexible display member.

2. The display apparatus according to claim 1, further comprising a lower transverse member at a lower end of the main section of the elongate support member, the lower transverse member is engageable with lower corners of the display member, and connection arrangements for engaging together the lower transverse member and lower corners of the display member.

3. The display apparatus according to claim 1, characterised in that each connection arrangement comprises a projection on a one of the display member or transverse member, the projection is selectively locatable in a corresponding recess in the other of the display member or transverse member, with at least one of the recess or projection being profiled such that as the transverse member is moved upwardly, the display member is urged outwardly.

4. The display apparatus according to claim 3, wherein the projection on each connection arrangement includes a profiled edge engageable with an edge of respective recess such that when the upper transverse member is moved upwardly, upper corners of the flexible display member are urged outwardly, the profiled edge of the projection is inclined upwardly inwards relative to a vertical alignment, the profiled edge of the projection is inclined downwardly inwards at lower ends of the display member, and a profiled edge on the recesses is engageable with a respective projection profiled edge.

5. The display apparatus according to claim 3, further comprising cooperable magnets respectively on the projections and recesses to facilitate correct location of a projection in a corresponding recess.

6. The display apparatus according to claim 3, wherein the projections are located on one or more transverse members, and the recesses are located on corners of the display member.

7. The display apparatus according to claim 3, further comprising stiffening strips at one or more ends of the display member, wherein the recesses are mounted at respective ends of the stiffening strips.

8. The display apparatus according to claim 3, wherein a lip is provided in each of the recesses such that a part of a respective projection is located behind the lip when engaged with the respective recess, the lip to retain the respective projection in the recess.

9. The display apparatus according to claim 4, wherein the profiled edge of at least one of the projection or the recess is inclined at an angle of between 30 and 60° to vertical.

10. The display apparatus according to claim 1, further comprising a ground engageable base that includes a foot that extends forwards and rearwards relative to the elongate support member.

11. The display apparatus according to claim 10, wherein the ground engageable base includes ground engageable projections extending from an underside of the lower transverse member.

12. The display apparatus according to claim 1, wherein the elongate support member comprises an elongate part providing the main section, and a mounting part providing the upper section, the mounting part is vertically slidably movable along an upper section of the elongate part and is resiliently upwardly urged, and wherein the elongate support member includes a channel which slidably locates the mounting part, the channel including a fixed member with the mounting part located in the channel above the fixed member with a resilient member in a form of a compression spring located therebetween.

13. The display apparatus according to claim 12, further comprising an upper mounting bracket that mounts the upper transverse member to the mounting part, and wherein a part of the mounting part is located in a channel.

14. The display apparatus according to claim 2, further comprising a lower mounting bracket that is fixedly connected to a lower part of the elongate support member to mount the lower transverse member.

15. A display assembly, comprising:

a plurality of display apparatus, each display apparatus of the plurality of display apparatus including:

a flexible display member in a form of a sheet of material;

a support arrangement, the support arrangement including an elongate support member locatable behind the flexible display member to support the flexible display member, the support member having a main section with a lower part which is engageable with a lower end of the display member and an upper section which is engageable with an upper end of the display member, the main and upper sections being resiliently urged apart so as to apply tension to the display member when engaged therewith; and an upper transverse member connected to the upper section of the support member, opposite ends of the upper transverse member are engageable respectively by connection arrangements with top corners of the display member, the connection arrangements being configured such that as the upper transverse member is moved upwardly, respective top corners of the display member are urged outwardly to apply tension across a top of the display member.

16. The display assembly according to claim 15, further comprising one or more additional flexible display members that are extendible between a pair of flexible display members supported by respective support arrangements, in which each additional flexible display member is not supported by a respective support arrangement.

17. The display assembly according to claim 16, wherein adjacent flexible display members are mountable together, and wherein adjacent flexible display members have cooperable strips extending along their side edges, the cooperable strips including corresponding magnets.

18. The display assembly according to claim 17, further comprising a magnetic strip along each rear side edge of the flexible display members, and a flexible connecting member including an elongate flexible magnet locatable behind and overlapping the flexible display members, the elongated flexible magnetic magnetically engageable with respective elongated flexible magnets on the adjacent display members.

19. The display assembly according to claim 18, wherein the flexible connecting member includes an upper mounting bracket that is engageable with respective connection arrangements on upper corners of the flexible display members.

20. The display assembly according to claim 18, further comprising a mounting bracket at the lower end of the flexible connecting magnet engageable with respective lower connecting arrangements.

* * * * *